Figure 1:
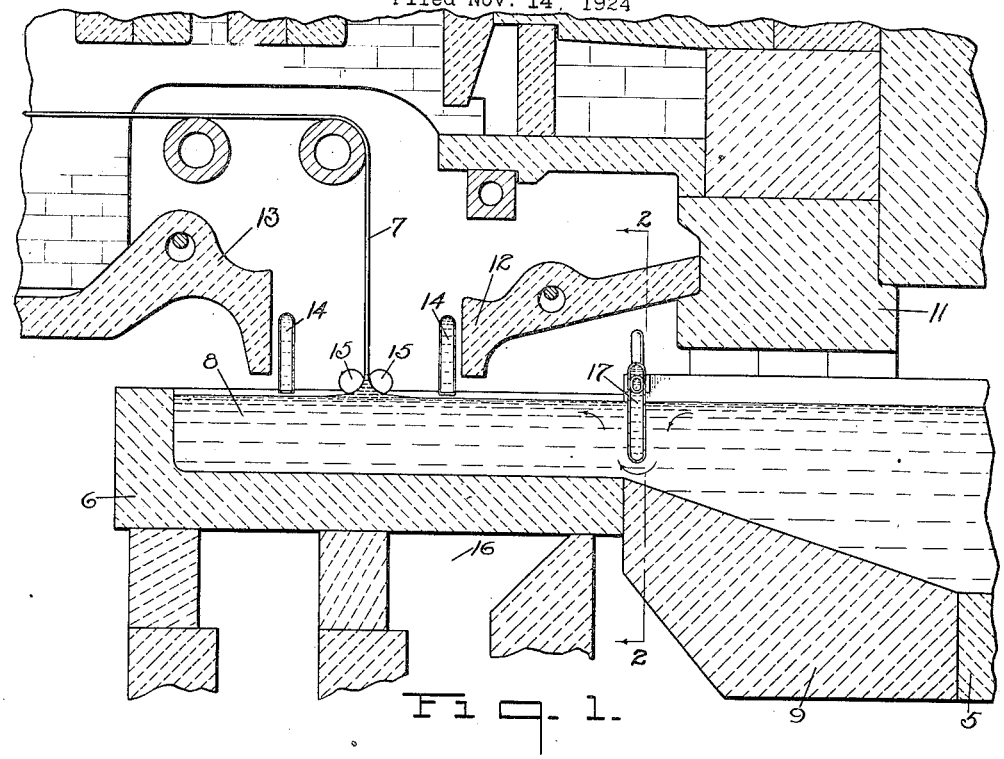

Aug. 10, 1926.

H. N. DIEDERICHS

DAM COOLER

Filed Nov. 14, 1924

1,595,861

INVENTOR.
Hugo N. Diederichs.
Frank Fraser
ATTORNEY.

Patented Aug. 10, 1926.

1,595,861

UNITED STATES PATENT OFFICE.

HUGO N. DIEDERICHS, OF CHARLESTON, WEST VIRGINIA, ASSIGNOR TO THE LIBBEY-OWENS SHEET GLASS COMPANY, OF TOLEDO, OHIO, A CORPORATION OF OHIO.

DAM COOLER.

Application filed November 14, 1924. Serial No. 749,852.

This invention relates to the art of drawing sheet glass, and more particularly to an improved process and apparatus for more rapidly conditioning the molten glass for the sheet drawing operation, and thus permitting an increased drawing rate and hence increased production.

In the system of drawing sheet glass substantially set forth in the Colburn Patent 1,248,809, granted December 4, 1917, a mass of molten glass is continuously produced in a tank furnace from which it flows into a shallow receptacle or draw-pot. A continuous sheet of glass is drawn upwardly from the surface of the molten glass in the draw-pot, then bent, while still somewhat plastic, about a cooled bending roller and carried away horizontally through an annealing leer. The surface glass adjacent the sheet source is exposed to the cooling influence of the air and heat absorbing shields are placed closely adjacent the surface glass at each side of the sheet source to protect the sheet from heated gases from the furnace, and also to absorb heat from the surface glass by flowing thereunder into the sheet source. By this means the molten glass is rapidly chilled just prior to being drawn into sheet form to reduce it to the proper drawing temperature.

According to the present invention an additional cooler or heat-absorbing body is positioned transversely of the molten glass flowing from the glass producing furnace into the receptacle from which the sheet is drawn. This heat-absorbing body is arranged at the juncture of the draw-pot and so-called goose-neck. The goose-neck is that member which connects the tank furnace and draw-pot and forms an inclined wall between the two. The lower portion of this cooler projects downwardly a substantial distance into the path of the flowing glass to obstruct its passage and to force the glass to flow down beneath the cooler. In this way the cooler functions to force a deeper flow of the surface strata of glass to the sheet source, and also by rapidly absorbing heat from this portion of the glass prior to its entrance to the sheet drawing zone expedites the conditioning of the glass and permits a more rapid withdrawal of glass therefrom in sheet form.

Other objects and advantages of the invention will become apparent during the course of the following description.

In the drawings wherein like numerals are employed to designate like parts throughout the same.

Figure 2:
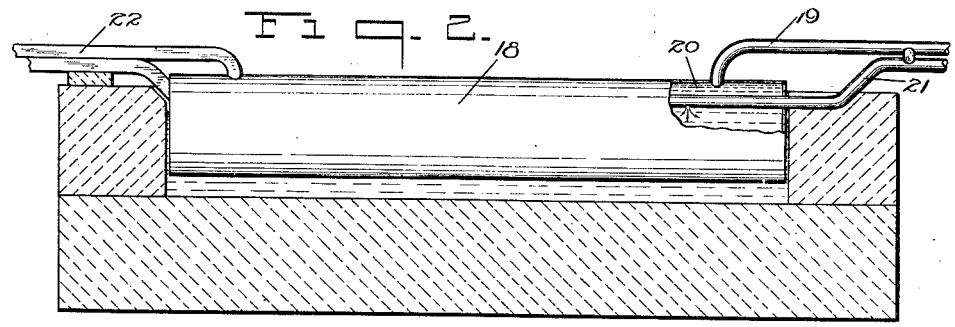
Figure 3:
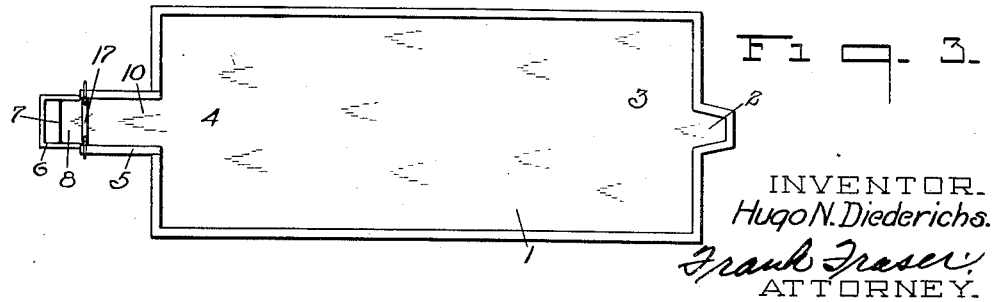

Fig. 1 is a longitudinal vertical section through those portions of the sheet-producing mechanism directly concerned with the present invention, Fig. 2 is a transverse vertical section taken substantially on the line 2—2 of Fig. 1, and Fig. 3 is a diagrammatic view, on a smaller scale, of the above apparatus in connection with the glass-producing furnace.

The glass-producing materials are inserted into the furnace 1 through dog-house 2, reduced in the melting end 3 of the furnace to molten glass. This molten glass then flows through the refining end 4 of the furnace into the smaller and shallower so-called cooling tank 5. From the cooling tank 5 the glass flows into the shallow receptacle or draw-pot 6, the glass sheet 7 being continuously drawn upward from the surface of the molten glass 8 in the draw-pot. The usual furnace chamber encloses the molten glass in the melting and refining tanks 3 and 4, and a so-called cooling chamber encloses the molten glass 10 in cooling tank 5. From the cooling tank the glass 10 flows under the jack-arch 11 into receptacle 6, and all of the surface glass in receptacle 6, except the comparatively narrow transverse strip from which sheet 7 is drawn upwardly, is enclosed by the lip-tiles 12 and 13. At each side of the sheet 7 a hollow metallic water-cooled shield 14 is placed with its lower edge closely adjacent to the surface of the molten pool 8. These shields or coolers 14 serve to protect the sheet source from heated gases flowing out under the lip-tiles 12 and 13, and at the same time rapidly absorb heat from the surface glass which passes under the lower edges of the cooler, thus reducing this glass to the proper temperature to be drawn into sheet form.

At 15 is indicated a pair of small sheet edge gripping rollers which function to maintain the proper width of the sheet, which is described more in detail in the Colburn patent referred to above. A heated chamber 16 beneath draw-pot 6 prevents excessive cooling of the lower strata of the glass in molten pool 8.

As is clearly shown in Fig. 1, a so-called goose-neck 9 is disposed between the draw-pot 6 and the cooling chamber 5. The goose-neck 9 closes the gap between the deeper pot 5 and the more shallow pot 6.

In accordance with the present invention an additional cooling member 17 is placed in the glass preferably at the juncture of the goose-neck and draw-pot 6. The cooling means 17 comprises an outer jacket 18 having an outlet pipe 19 through which the water or other cooling medium 20 passes. A perforated inlet pipe 21 is adapted to be run through the cooling means for continuously introducing the desired cooling medium. Cooler 18 is supported by the members 22 or other desired hangers. The cooler 18 may be submerged to the desired depth in the pool of glass 8 in a manner that the molten glass flowing from the tank furnace to the pot will be caused to flow down underneath the said cooler to expose the glass to the cooling action of the said cooler. This additional cooler assists the cooler 14 at the sides of the sheet source in reducing the molten glass to the proper working temperature. With the assistance of the additional cooler 17, the sheet 7 may be withdrawn from the pool 8 at a more rapid rate, and the productive capacity of the machine is materially increased. At the same time the enforced passage of the surface glass beneath the cooler tends to eliminate surface defects in the glass sheet. It has been found with the cooler arranged at the juncture of the goose-neck and draw-pot 6, that a much smoother and more satisfactory sheet 7 is produced at a greater speed than without the use of said cooler.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass drawing apparatus, a receptacle containing a pool of molten glass, means for drawing a sheet of glass from the surface of the pool, means at either side of the sheet source for cooling the surface of the glass, and an additional cooling means partially submerged in the pool of molten glass.

2. In sheet glass drawing apparatus, a receptacle containing a pool of molten glass, a tank furnace in open communication with the receptacle at one side thereof, means for drawing a sheet of glass from the surface of the pool, and means partially submerged in the molten glass at the juncture of the said receptacle and tank furnace.

3. In sheet glass drawing apparatus, a receptacle containing a pool of molten glass, a tank furnace in open communication with the receptacle at one side thereof, means for drawing a sheet of glass from the surface of the pool, and cooling means partially submerged in the molten glass at the juncture of the said receptacle and tank furnace.

4. In sheet glass drawing apparatus, a receptacle containing a pool of molten glass, a tank furnace in communication with the receptacle at one side thereof, means for drawing a sheet of glass from the surface of the pool, means arranged at either side of the sheet source for cooling the surface glass, and an additional cooling means partially submerged in the glass at the juncture of the receptacle and tank furnace.

5. In sheet glass drawing apparatus, a receptacle containing a pool of molten glass, a tank furnace, a goose-neck arranged between the receptacle and tank furnace for connecting the two, means for drawing a sheet of glass from the surface of the pool of glass, and cooling means arranged at the juncture of the receptacle and goose-neck and partially submerged in the flow of glass to cause the glass to pass down under the cooling means.

6. In sheet glass drawing mechanism, a receptacle containing a pool of molten glass, means to draw a sheet of glass from said pool, means at either side of the sheet source for cooling the surface glass, a tank furnace for supplying molten glass to the receptacle, a goose-neck connecting the receptacle and tank furnace, and additional cooling means submerged in the glass at the juncture of the receptacle and goose-neck for cooling the surface glass.

7. In sheet drawing apparatus, a draw-pot, a tank furnace for supplying molten glass to the draw-pot, and means at the juncture of the two for causing the glass passing from the tank furnace to the draw-pot to pass thereunder.

Signed at Charleston, in the county of Kanawha, and State of West Virginia, this 10th day of November, 1924.

HUGO N. DIEDERICHS.